May 19, 1964
M. R. GOULD ETAL
3,133,818
PROCESS FOR PRECOOKING A SUBSTANTIALLY-WATER-INSOLUBLE
FARINACEOUS PRODUCT
Filed April 4, 1960
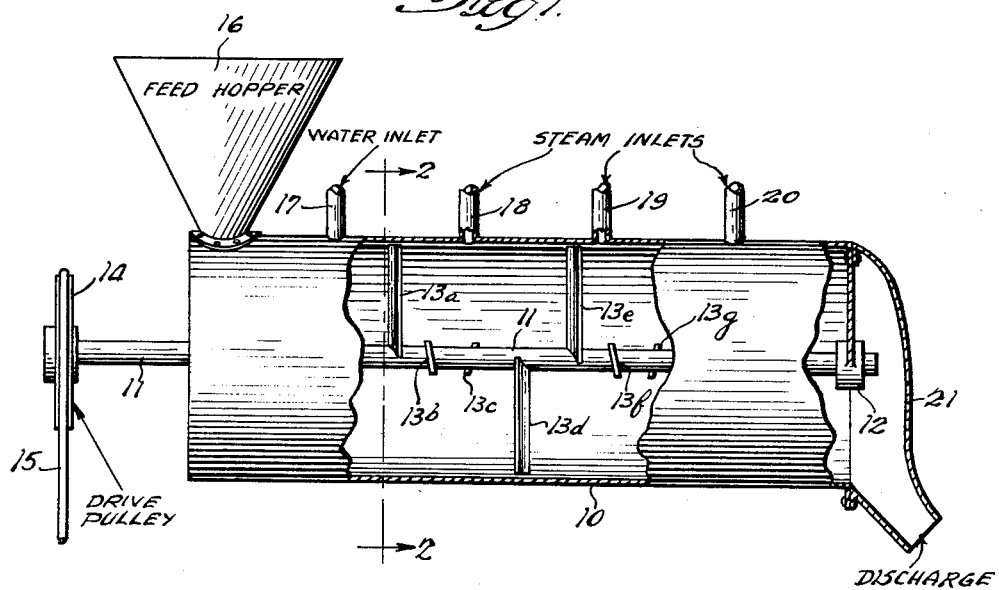
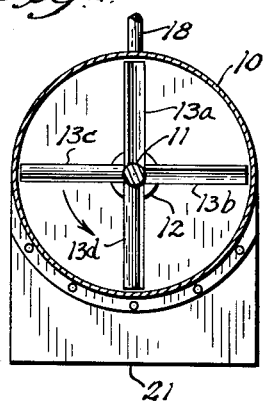
INVENTORS
May R. Gould &
BY Donald L. Swartz

3,133,818
PROCESS FOR PRECOOKING A SUBSTANTIALLY-WATER-INSOLUBLE FARINACEOUS PRODUCT

Max R. Gould and Donald L. Swartz, Barrington, Ill., assignors to The Quaker Oats Company, Chicago, Ill., a corporation of New Jersey
Filed Apr. 4, 1960, Ser. No. 19,535
3 Claims. (Cl. 99—80)

The present invention relates to farinaceous products and a process for precooking same which lends itself to low-cost, high-capacity production. More particularly, it relates to a selective and economic process for precooking cereals and legumes to form "instant-type" products, which process is free of the shortcomings of prior-art precooking processes, particularly the high investment cost of large volume output, and results in products of superior quality.

The precooking of substantially-water-insoluble farinaceous products, particularly cereals such as corn, oats, barley, wheat and the like, and legumes, such as peas, beans, lentils, soybeans, peanuts and the like, involves subjecting the product to conditions which bring about one or more changes such as starch modification (gelatinization of varying degrees), protein denaturation and/or enzyme inactivation, following which the product is usually dried, comminuted, and/or the like and packaged for future use. The resulting precooked product can then be readily and simply prepared for human consumption by mere rehydration, i.e., adding water or other aqueous-containing medium, e.g., milk or a milk product, to it. Such precooked products are sometimes referred to as "instant-type" or "ready-to-eat" foods.

Prior art processes for precooking such products have, unfortunately, suffered from one or more of a number of shortcomings. It is, therefore, a general object of the present invention to provide a process for precooking farinaceous products which is free of these shortcomings and which results in a product of superior quality.

Specifically, some of the prior art processes do not, in fact, precook the product. Instead, extraneous materials, such as certain phosphate salts, protease enzymes, or the like are added. These merely speed up the cooking step carried out by the consumer. Thus, these so-called "instant-type" products are not normally considered suitable for consumption as is, and should be subjected to a certain degree of cooking before they are considered palatable. It is, therefore, a specific object of the present invention to provide a process which actually precooks the product so that it is palatable as is, without further cooking.

Some prior-art precooking processes, particularly those involving kneading and/or extrusion of the raw material, do not lend themselves to large-volume production and/or necessitate high investment outlays and/or excessive operating costs. It is, therefore, a further specific object of the present invention to provide a process which lends itself to high-capacity output without excessive investment and operating costs.

Some prior art processes do not lend themselves to the precooking of finely-divided or powdered raw materials, and/or the product produced therefrom cannot be added to boiling water without formation of undesired and unpalatable lumps. It is, therefore, another specific object of the present invention to provide a process which particularly lends itself to the precooking of finely-divided or powdered raw materials, i.e., finely-divided cereals and/or legumes, and which results in a product which may be directly added to boiling water to form a product of even texture.

Some prior art processes for precooking require long-time contact, i.e., more than 0.1 hour, and/or super-atmospheric pressures. It is, therefore, still another specific object of the present invention to provide a process that requires only short-time contact, even at atmospheric pressure.

Some prior art processes for precooking require the addition of substantial quantities of water, i.e., substantially more than the weight of the product itself. This water must subsequently be removed by expensive drying techniques. It is, therefore, still another specific object of the present invention to provide a process for precooking wherein the amount of extraneous moisture added and the subsequent drying operation are substantially minimal.

Some prior-art processes are not selective with respect to the particular changes resulting from the precooking operation and/or with respect to the characteristics of the finished product. It is, therefore, still another specific object of the present invention to provide a process wherein process variables can be readily adjusted so as to achieve, if desired, enzyme inactivation without substantial starch modification, and/or the adjustment of specific characteristics of the resultant finished product, e.g., the degree of absorption, adhesiveness, cohesiveness, and the like.

Other prior art processes do not lend themselves to the treatment of mixtures of various cereals, legumes, additives and the like. It is, therefore, still another specific object of the present invention to provide a process which effectively handles a variety of raw materials in admixture and results in a substantially homogeneous precooked product.

These and other objects of the present invention, including the manufacture of a superior precooked product as determined by organoleptic testing, will become apparent as the detailed description thereof proceeds.

To achieve these objects and to produce the superior product of the present invention, a unique precooking process is employed, which process comprises contacting the uncooked farinaceous product, i.e., a cereal and/or legume, in the form of highly dispersed, finely-divided particles with a heat-affording medium (preferably a condensable gaseous medium, e.g., steam) at elevated temperatures for at least about two seconds and in the presence of sufficient total moisture whereby the resulting precooked product prior to any substantial drying thereof has a moisture content in the range of about 15 to 50 percent by weight, wet basis. The precooked product, which may comprise agglomerates of individual precooked particles, is then normally dried, reground and/or cooled, the particular sequence of these steps, if any, being a matter of choice.

The resulting precooked product can be consumed as is, or more usually, served hot or cold after the addition of water or other aqueous-containing medium, such as milk, to rehydrate the product. Advantageously, the product may be added, while stirring, to boiling water without the formation of undesired lumps. While the product does not appear to differ from prior-art products of the same type, it does differ in some undefined manner, particularly with respect to flavor, taste and/or mouth feel, as determined by organoleptic testing. A typical example of the practice of the present invention is the treatment of uncooked corn meal by the process herein described to produce a precooked base for instant-type polenta.

It is an essential of the present invention that the material to be precooked be in a finely-divided form. By "finely-divided" is meant a particle size small enough so that substantially all of the product will pass at least a No. 6 sieve, U.S. Sieve Series ("Chemical Engineers' Handbook," third edition, copyright 1950, McGraw-Hill Book Company, page 963), i.e., a sieve having a sieve opening of 0.132 inch. In a preferred embodiment, the particle size should pass a No. 10 sieve, i.e., a sieve opening of 0.0787 inch, optimally a No. 20 sieve, i.e., a sieve opening of 0.0331 inch. If the raw material has a particle size larger than above indicated, it may be ground to the appropriate particle size by conventional techniques, e.g., by the use of grinders, comminuting machines, hammer mills, corrugated rollers, and/or the like.

It is another essential of the present invention that the finely-divided raw material be highly dispersed while being treated. By "highly-dispersed" is meant the product is in the state of agitation such that the treating medium, i.e., the heat-affording medium, may contact at least a substantial portion of the surface of each individual particle substantially continuously. Thus, because of the small size of the particles and large surface area exposed to the heat-affording medium, each of the particles quickly reaches and is maintained at an elevated temperature, as hereinafter defined, for substantially the entire contacting time.

The state of high dispersion can be brought about by fluidized-solid techniques, the gas rate depending, in part, on particle size and the like; by use of high velocity gases, particularly in baffled chambers; by high-velocity Venturi systems; and the like. In a very advantageous embodiment of the present invention, which requires substantially less moisture for a given degree of precooking, the use of means for mechanically agitating the particles so as to subject them to substantial physical stresses, particularly sheer stresses, is recommended. One such means, for example, may be a cylindrical vessel having a rotor with mixing paddles, or blades, which are rotated at high speed, e.g., 100 to 5000 r.p.m. Such a means is described hereinafter in the detailed description of a specific embodiment.

Another essential of the present invention is the presence of sufficient total moisture whereby the resulting precooked product prior to any substantial drying thereof has a moisture content in the range of 15 to 50 percent by weight, wet basis. At least about 15 percent of moisture is required to bring about the physical and/or chemical changes associated with the precooking operation. No more than about 50 percent of moisture is desired because of the excessive drying loads above such levels.

"Total moisture" is the final moisture content of the precooked product prior to any substantial drying and may be measured as the precooked material leaves the treating unit but prior to any substantial drying. "Total moisture" may thus include moisture naturally occurring in the raw material, moisture present from deliberate prewetting of the product, and/or moisture derived from the heat-affording medium, particularly when the heat-affording medium is steam. Naturally-occurring moisture in the raw material is normally present in amounts of about 4 to 14 percent by weight, wet basis. Additional moisture must, therefore, be added by prewetting and/or by using a moisture containing heat-affording medium. Where substantial starch modification is desired, all three sources of moisture are normally employed.

The particular source of moisture, however, does provide one of several degrees of flexibility in the present process. It has been unexpectedly found that inactivation of enzymes can be carried out without substantial starch modification if the moisture content of the raw material prior to contacting it with the heat-affording medium is less than about 15 percent by weight, i.e., in the range of naturally-occurring moisture. This is readily accomplished by omitting any prewetting step and contacting the finely-divided, highly-dispersed raw material directly with a moisture-containing, heat-affording medium. The moisture in the heat-affording medium must, of course, be sufficient to raise the moisture content above about 15 percent by weight, wet basis. Thus, the presence or absence of the prewetting step is substantially determinative of whether substantial starch modification accompanies the inactivation of enzyme. If both starch modification and enzyme inactivation are desired, the raw material should be prewetted to a level in the range of 15 to 50 percent by weight, wet basis, prior to or substantially simultaneously with the contacting step.

Still another essential of the present process is the use of an elevated temperature during the contacting step. By "elevated temperature" is meant a temperature in excess of at least about 150° F., preferably above 170° F. and optimally in the range of 190 to 220° F. Such elevated temperatures are obtained conveniently and preferably by the use of hot water during the prewetting step, if any, and steam, usually not substantially above atmospheric pressure, during the contacting step.

The use of steam as the heat-affording medium during the contacting step is highly advantageous for several reasons, in addition to convenience and economy. Specifically, because of the latent heat of vaporization, the condensation of even a small amount of steam provides substantial heat during the contacting step without addition of excessive moisture or use of high volumetric throughputs. To get the same amount of heat from hot water would result in excessive moisture and uneconomic drying loads. To get the same amount of heat from a hot gas such as hot air would necessitate large gaseous volumes. Further, additional prewetting water would be required to compensate for the moisture otherwise derived from condensed steam.

While the present process has as one of its advantages the fact that it can be operated at substantially atmospheric pressure, it should be understood that pressures above or below atmospheric pressure may be employed if desired. Normally, however, substantially atmospheric pressures have been found to be most convenient. It should also be understood that while temperatures not substantially above about 220° F. are usually employed, higher temperatures may also be employed so long as the higher temperatures are not otherwise deleterious to the product, i.e., temperatures which do not cause charring; burning; undesired taste, flavor or color modifications; or the like. To avoid such danger, temperatures should be kept substantially below about 400° F. and preferably below 300° F.

Another advantage of the present process is the fact that even very short contact times are operative. While the contact time should be in excess of about 2 seconds, it has been found that the contact time normally need never exceed about 200 seconds. Preferably, the contact time is in the range of about 5 seconds to 45 seconds. These times are in sharp contrast to the contact times required in some processes of the prior art, e.g., 0.1 to 1.0 hour, or more.

The steps of cooling, grinding and drying of the precooked product may be carried out by conventional techniques. The particular sequence of these steps is optional, and any one or more of the steps may be omitted. Drying temperatures should, of course, be controlled so that the product does not suffer any deleterious effects. In a preferred embodiment, drying is carried out by conveying the material with a hot gas at temperatures of 200 to 1000° F. Because of the effect of the evaporative cooling which takes place, the product itself seldom reaches substantially above 200° F.

The presence or absence of a prewetting step has already been mentioned as a means for controlling or tailoring the character of the finished product, particularly with respect to the relative degrees of enzyme inactivation and starch modification. The process of the present invention also permits the control or tailoring of other product characteristics. For example, when starch modification is desired, higher prewetting water temperatures, higher agitation levels, lower feed rates, and/or higher initial steam pressures (and thus temperatures) increase the degree of treatment or "cook." An increase in the degree of "cook" usually manifests itself in such product characteristics as increased adhesiveness, cohesiveness and water absorption. As another example, proper control of granulations, e.g., particle sizes falling substantially in the range between No. 10 and 70 sieves, preferably between No. 16 and No. 60 sieves, as is illustrated in certain of the specific examples hereinafter, renders the precooked product of the present invention suitable for direct addition, with stirring, to boiling water without formation of undesired lumps.

The particular product characteristics to be achieved in any particular case depend on the type of cereal or legume which is being precooked and the end use to which it is to be put. The particular process variables to achieve the desired characteristics will be apparent to those skilled in the art in the light of the present disclosure, particularly the detailed description of a specific embodiment and the specific examples hereinafter set forth.

While the process of the present invention is generally described herein as being applied to the precooking of a single cereal or legume, it should be understood that it is equally applicable to handling more than one cereal or legume, or both, at one time. In addition, other additives, e.g., sugar, tapioca flour, flavoring ingredients, coloring ingredients, or the like, usually in minor amounts, i.e., less than 50 percent by weight, may also be incorporated with the cereal, legume, and/or derivatives or combinations.

The ability of the process to handle mixtures of finely-divided raw materials results in still another advantage of the present invention. Specifically, during the treatment of a mixture in accordance with the present invention, the various components of the mixture tend to agglomerate so as to form substantially homogeneous particles. Even after such particles are subsequently reground, the resulting finely-divided product is substantially homogeneous in nature and does not result in any substantial particle classification.

In a preferred embodiment of the present invention, the farinaceous product to be precooked is ground so that substantially all passes at least a No. 6 sieve, preferably at least a No. 10 sieve, and optimally at least a No. 20 sieve, or finer. It is then prewetted to a moisture content in the range of about 15 to 50 percent by weight, wet basis, by means of a water spray, the water temperature preferably being substantially above ambient temperatures, i.e., above 100° F., e.g., 175 to 210° F. The product is mechanically agitated so that it is highly dispersed and contacted with steam at about atmospheric pressure for a period of about 5 to 45 seconds. The steps of prewetting, mechanically agitating and contacting are preferably carried out substantially simultaneously, as is the case in the detailed description of a specific embodiment hereinafter set forth. The precooked product is preferably dried to a moisture content below 15 percent by weight, wet basis, e.g., 5 to 10 percent, reground so that the particle sizes substantially fall between No. 10 and No. 70 sieves, preferably between No. 16 and No. 60 sieves, and cooled. The resulting product may then be packaged, stored and/or shipped for eventual human consumption, for which it is readily prepared, usually by mere rehydration.

The process of the present invention will be more clearly understood by reference to the following detailed description of a specific embodiment, which is to be read in conjunction with accompanying drawing, wherein:

FIG. 1 is a partial-cutaway elevation view of a typical device for carrying out the steps of prewetting, mechanically agitating and contacting the highly-dispersed farinaceous product with the heat-affording medium, e.g., steam; and FIG. 2 is a section view taken along sectional lines 2—2 of FIG. 1.

Referring to FIGS. 1 and 2 together, the apparatus comprises a horizontal, cylindrical-type vessel 10, which contains a rotatable shaft 11, which extends through vessel 10 and is centrally supported by bearing 12 adjacent the right extremity and a second bearing, which is hidden in FIG. 1, adjacent the left extremity. Mounted at various points along shaft 11 are radial blades or paddles 13a–13g (and others not shown) at 90° intervals, as is apparent from FIG. 2.

Blades 13a–13g are substantially rigid and are typically fabricated from steel. They are angled or deflected with respect to shaft 11 so that when they are rotated (counter-clockwise in FIG. 2) they will cause material in the vessel to be conveyed in a left-to-right direction in FIG. 1. Central shaft 11 and its steel blades are rotated at high speed, i.e., 100 to 5000 r.p.m., by means of drive pulley 14, which in turn is rotated by drive belt 15 from a conventional motive source (not shown), e.g., an electric motor.

The product to be precooked, which normally contains less than about 15 percent by weight of moisture, wet basis, is comminuted so as to pass at least a No. 6 sieve, U.S. Sieve Series, by conventional means (not shown) and is deposited in feed hopper 16, from which it is fed into the interior of vessel 10. In this embodiment, wherein substantial starch modification as well as enzyme inactivation is desired, it is prewetted by means of water injected via water spray inlet 17.

The water is preferably heated, prior to injection, in a suitable water heater, e.g., a heat exchanger, and may optionally be super-heated under pressure so that a portion of it will vaporize when it is introduced into vessel 10 at atmospheric pressure. If the raw material is a finely-divided cereal, sufficient prewetting water is usually introduced to raise the moisture content to the range of about 20 to 40 percent by weight, wet basis. If the raw material is a finely-divided legume, sufficient prewetting water is usually introduced to raise the moisture content to the range of about 15 to 30 percent by weight, wet basis.

As the finely-divided raw material from feed hopper 16 passes into vessel 10, it is violently agitated and highly dispersed by the high speed rotation of shaft 11 with its plurality of radial blades. The violent agitation of the raw material subjects it to substantial stresses, particularly sheer stresses, and while in this condition, it is simultaneously contacted with a heat-affording medium, e.g., steam, which is injected via inlets 18, 19 and 20. While vessel 10 is conveniently operated at atmospheric pressure, steam may be introduced from a super-heated steam source at pressures substantially above atmospheric pressure. The finely-divided material is typically contacted with steam for periods of about 2 to 200 seconds, e.g., 5 to 45 seconds. Sufficient steam is introduced so that the moisture content of the product exiting via discharge 21 is in the range of about 15 to 50 percent by weight, wet basis.

The product exiting at discharge 21, which is cooled, dried, and/or reground to the extent desired, comprises agglomerates of the individual particles of the material charged, which agglomerates are unexpectedly distinguished by greatly-enhanced dispersibility and anti-lumping characteristics. These desirable characteristics are particularly apparent when the precooked material is added to boiling water to form an even-textured food suitable for human consumption.

As previously indicated, one of the advantages of the process of the present invention is the fact that it lends itself to high-capacity, large-volume throughputs. Illustrative of this is the fact that the cylindrical vessel shown in FIGS. 1 and 2 may typically be only about 3 or 4 feet long with an inside diameter of only about one foot. Notwithstanding its small size, the unit is capable of continuously precooking as much as 10 to 20 tons or more of cereals and/or legumes per day. The investment and operating cost per unit of precooking capacity is thus substantially less than that experienced with apparatuses and techniques of the prior art.

The present invention will be more clearly understood by reference to the following specific examples.

Example 1

30 pounds of whole green peas were immersed in a mesh basket in an excess of boiling water for about 9 minutes. The peas were then drained and were found to have a moisture content of 22 percent by weight, wet basis. The drained peas were ground on a comminuting machine so as to pass at least a No. 6 sieve. The resultant meal was sent to a precooking unit of the type above described at the rate of about 1000 pounds per hour, said precooker operating at substantially atmospheric pressure. The blades in the unit were operated at a speed of about 120 r.p.m. and resulted in a residence time for the comminuted peas of approximately 15 seconds. The heat-affording medium in the unit was steam, which was injected from a 10 p.s.i.g. steam source. The temperature of the meal at the exit of the unit was 210° F. and the moisture content was 23 percent by weight, wet basis. The precooked meal was dried on a pan or table-type drier to a moisture content of approximately 8 percent by weight, wet basis. It was reground on a comminuting machine and screened to pass a No. 50 sieve.

The resulting precooked product was then employed in the preparation of a pea soup base. Specifically, about 85 percent by weight of the precooked meal and about 15 percent by weight of a conventional, commercially-available spice mix were admixed; water was added in the proportion of about 1 cup of water per ounce of the mixture; and the resulting base heated to a palatable temperature. The resulting pea soup did not appear different from prior-art pea soups made with the same peas and spice mix, but by conventional techniques. Notwithstanding, organoleptic testing showed it to be superior in taste.

Example 2

100 pounds of dried whole green peas, having a moisture content of about 10 percent by weight, wet basis, were ground in the comminuting machine so as to pass at least a No. 10 sieve. The resultant meal was fed into a precooking unit of the type above described at a rate slightly in excess of about 1500 pounds per hour. At the entrance of the cooking unit, water was injected for prewetting purposes at the rate of 0.5 gallon per minute at a temperature of 212° F. The blades of the unit were rotated at about 117 r.p.m., and the residence time for the material in the unit was about 19 seconds. The heat-affording medium (in addition to the hot water employed for simultaneous prewetting) was steam which was injected from a 10 p.s.i.g. steam source. The temperature of the precooked material at the exit of the unit was 210° F., and the moisture content was 23 percent by weight, wet basis.

Part of the meal exiting from the unit was reground, screened to pass a No. 50 sieve, and then dried on a pan or table-type drier. The remaining portion of the meal exiting from the unit was first dried and then reground as above. Both portions yielded an excellent pea soup base, as determined by organoleptic testing of a soup prepared in substantially the same manner as described in Example 1.

Example 3

100 pounds of dried lentils, having a moisture content of 9.6 percent by weight, wet basis, were ground in a comminuting machine so as to pass a No. 6 sieve. The resultant meal was then fed into the entrance of a precooking unit of the type above described at the rate of about 1600 pounds per hour. At the entrance of the unit, water at about 212° F. was injected for prewetting purposes at a rate of about 0.55 gallon per minute. The blades of the unit were operated at about 120 r.p.m., and the resultant residence time for the comminuted lentils in the unit was about 21 seconds. The heat-affording medium was steam, which was injected from a 10 p.s.i.g. steam-source. The temperature of the resultant procooked meal at the exit of the unit was 206° F., and the moisture content was about 22 percent by weight, wet basis. The precooked meal was then reground in a comminuting machine and dried by passage through a duct system containing drying gases at a temperature of 306° F. The dried meal was then screened so as to pass a No. 50 sieve.

A tentil soup base was then prepared in substantially the same manner as described in Example 1. The resulting soup was found by organoleptic testing to be superior in taste as compared with soups prepared by conventional techniques.

Example 4

A quantity of pinto beans, having a moisture content of about 14 percent by weight, wet basis, was ground to pass a No. 6 sieve. The resulting meal was fed to a precooker of the type above described at the rate of 1300 pounds per hour. At the entrance of the precooker, water at a temperature of 212° F. was injected for prewetting purposes at the rate of 0.2 gallon per minute. The blades of the unit were operated at the rate of 117 r.p.m., and the resultant residence time for the ground pinto beans in the unit was approximately 19 seconds. Steam from a 100 p.s.i.g. source was the heat-affording medium. The temperature of the precooked product at the exit of the unit was 205° F., and the moisture content was about 29.8 by weight, wet basis. A portion of the resultant product was again passed through the precooking unit under the same conditions as before except that no prewetting water was introduced.

Both portions were then individually dried in a hot gas duct, reground in the comminuting machines so as to pass a No. 50 sieve and then used to prepare soups in the same manner as previously described. Both soups were found to have an excellent flavor by organoleptic testing. The soup made from the portion of the precooked product which was passed through the precooker twice was found to have a slightly different flavor from the remaining portion.

Example 5

100 pounds of baby lima beans having a moisture content of about 14 percent by weight, wet basis, were ground to pass a No. 10 sieve. The resulting meal was then fed to a precooker of the type previously described at the rate of 1300 pounds per hour. At the entrance to the precooker, water at 212° F. was injected for prewetting purposes at the rate of 0.52 gallon per minute. The blades in the unit were operated at 117 r.p.m., and the residence time in the unit was approximately 19 seconds. Steam from a 150 p.s.i.g. source was employed as the heat-affording medium. The temperature of the product at the exit of the precooker was 209° F., and the moisture content was 29 percent by weight, wet basis. The precooked meal was then dried in a hot-gas duct system and reground to pass a No. 50 sieve. A lima-bean soup base was then prepared in the manner previously described, and the resulting soup was found to be excellent in all qualities.

Example 6

Whole raw soybeans were ground in a comminuting machine, and the resultant soybean meal was found to have a moisture content of 9.7 percent by weight, wet basis. The ground meal was fed to a precooker of the type above described at the rate of 6.5 pounds per minute. At the entrance to the precooker, water at 250° F. and 50 p.s.i.g. was injected for prewetting purposes at the rate of 0.15 gallon per minute. Steam from a 120 p.s.i.g. steam source was employed as the heat-affording medium. A series of tests were made with the mixer shaft and attached blades of the unit rotating at various preselected speeds. The results obtained at various speeds are presented in the following table:

| Mixer Shaft, r.p.m. | Moisture of Product at Exit, Weight Percent | Urease Activity |
|---|---|---|
| 120 | 32.8 | 0.58 |
| 335 | 37.0 | 0.47 |
| 550 | 43.4 | 0.00 |

The above data indicate that the exit moisture increases and the urease activity decreases as the shaft speed increases. Urease activities determined in this series of experiments are intended to be used as rough indicators of the degree of "cook." The method of determining urease activity is that described by Bird et al. in the Journal of the Association of the Official Agricultural Chemists, vol. 30, 1947, pages 354–364. Very briefly, urease activity is the increase in pH units resulting from the activity of 400 milligrams of a particular sample. Generally speaking, urease activity should be below about 0.15 for a satisfactory product.

In each experiment, the precooked material exiting from the precooker was dried to a moisture content of about 6 to 7 percent by weight, wet basis, by subjecting it to air at a temperature of 185 to 200° F. for approximately ten to fifteen minutes on a table-type dried. The above data indicate that the urease activity of full fat soybeans can be readily reduced to a satisfactory low level in a continuous type precooker operating under atmospheric or essentially atmospheric conditions.

*Example 7*

Approximately 50 pounds of white pearled hominy, commonly known as 4/5 grits, having a moisture content of about 9 percent by weight, wet basis, were ground in a comminuting machine so as to pass at least a No. 10 sieve. About 25 pounds of the ground material was placed in a small batch-type ribbon mixer and, by the addition of water, the material was tempered to a moisture content of 28.0 percent by weight, wet basis. The remaining 25 pounds of the ground grits were similarly tempered to a moisture content of 34.8 percent by weight, wet basis. Each of the 25-pound batches was then separately fed to a precooker of the type above described at the rate of about 500 pounds per hour. In each case, the shaft of the precooker was rotated at about 120 r.p.m., and the residence time in the unit was about 15 seconds. Steam, having a line pressure of about 1 to 3 pounds p.s.i.g., was the heat-affording medium.

The product fed to the precooker at 28.0 percent moisture had an exit moisture of 29.0 percent. The product fed at 34.8 percent moisture had an exit moisture of 38.8 percent. Each product was then cooled on a table-type drier by passing air at room temperature through the product for 10 to 15 minutes. Each of the cooled products was then ground in a comminuting machine, dried to a moisture content of about 6 to 10 percent by weight, wet basis, and then reground in a hammer mill, thereby producing a slightly coarse flour.

The product resulting from each of the 25-pound batches was then compared with grits which were prepared by prior-art techniques and which had the same particle size. The prior-art product was found to have a water absorption of about 1 gram per gram of product and produced an undesirable sandy-textured dough. In contrast, the product fed to the precooker at 28.0 percent moisture absorbed water more rapidly, had a water absorption of 1.6 per gram of product, and was found to be less sandy in texture and to be characterized by greater adhesiveness and cohesiveness. In further contrast, the product fed to the precooker at a moisture content of 34.8 percent absorbed water even more rapidly, had a water absorption of 2.0 grams per gram of product, and was found to have a smooth texture and to be characterized by even greater adhesiveness and cohesiveness.

In the above comparisons, "water absorption" is that weight of unheated water which a unit weight of the flour will absorb and produce a dough which is firm and in which the water is thoroughly bound.

*Example 8*

Fifty pounds of degerminated corn meal, having a moisture content of about 8 percent by weight, wet basis, was ground in a comminuting machine so as to pass at least a No. 6 sieve and was mixed in a batch-type ribbon mixer with other ingredients so as to have the following final formulation:

Material: Weight percent
  Corn meal _____ 50
  Sugar _____ 20
  Wheat flour _____ 15
  Tapioca _____ 15

The above-formulated mixture was fed to a precooker of the type above described at the rate of about 26–27 pounds per minute. At the entrance to the precooker, water at 215° F. and a pressure of about 50 p.s.i.g. was injected for prewetting purposes at the rate of about 0.60 gallon per minute. The shaft speed of the blades was approximately 740 r.p.m., which resulted in a residence time of about 15 to 20 seconds. Steam from the steam line at 7 p.s.i.g. was the heat-affording medium. The moisture of the product exiting from the unit was about 24 percent by weight, wet basis.

The precooked product exiting from the precooker was divided into two portions. One portion was ground in a comminuting machine, and the resulting ground portion and the remaining unground portion were dried to a moisture content of 6 to 8 percent by weight, wet basis, by subjecting both portions to air at about 200° F. for about 20 minutes on a table-type drier. Both portions were then ground in a granulating grinder and reground as necessary to obtain various sizings, e.g., materials passing through Nos. 16, 18 or 20 sieves with no more than 3 to 5 percent passing through a No. 70 sieve. It was found that each of the resulting finely-divided products could be added directly, with stirring, to boiling water without the development of undesired lumps, which are normally encountered with similar prior-art products.

*Example 9*

Yellow degerminated corn meal having a moisture content of 11.0 percent by weight, wet basis, and having a particle size which passes at least a No. 6 sieve, was fed to a precooker of the type above described at the rate of about 8 pounds per minute. Simultaneously, water at at 260° F. and 50 pounds p.s.i.g. was injected for prewetting purposes at the rate of 0.425 gallon per minute. Also simultaneously, steam from a 120 p.s.i.g. source was injected as the heat-affording medium. The shaft speed of the mixing blades was approximately 250 r.p.m., and the residence time was about 10 to 15 seconds. The product leaving the precooker had a moisture content of 44.0 percent by weight, wet basis, was ground on a comminuting machine and dried on a table-type drier with air at approximately 200–210° F. for about 20 to 25 minutes. Final moisture content was about 6 to 10 percent by weight, wet basis.

One portion of the resulting precooked product was ground in a hammer mill and compared with the same yellow degerminated corn meal which had not been precooked but which had also been ground in a hammer mill to the same particle size. The meal which had not been precooked showed a cold water absorption of about 100 percent by weight. In contrast, the precooked meal absorbed 220 percent by weight of water and was considerably more adhesive and cohesive in character. Furthermore, the precooked material took up the water very rapidly and did not have the short, "sandy" characteristics of the material which had not been precooked.

Another portion of the precooked material was ground and reground as necessary in a granulating-type grinder so that all would pass a No. 25 sieve and no more than 3–4 percent would pass through a No. 70 sieve. It was found that this granulated material had properties that were very suitable for use as a base for an instant-type polenta and other similar products where precooking the meal would be of value in shortening the preparation time, improving the texture, or increasing the water-absorbing ability. Further, it was found that the precooked meal could be added directly, with stirring, to boiling water without forming lumps, whereas the meal which had not been precooked had numerous lumps throughout.

*Example 10*

200 pounds of white degerminated corn meal, having a moisture content of about 11 to 12 percent by weight, wet basis, was fed into a precooker of the type above described at the rate of about 24 pounds per minute. Water at a temperature of about 58 to 60° F. and at a pressure of about 50 pounds p.s.i.g. was injected into the the precooking chamber for prewetting purposes at the rate of about 1.05 gallons per minute. The blades of the precooker were rotated at 180 r.p.m., and the residence time was about 15 seconds. No steam or other heat-affording medium was injected into the precooking chamber during the first pass of the corn meal. Thus, the uncoked corn meal exited from the unit at a moisture content of 34.5 percent by weight, wet basis. It was then repassed through the precooker while steam was injected from a 15 p.s.i.g. steam source as the heat-affording medium. During this second pass the blade speed was about 120 r.p.m., and the residence time was about 20 seconds. The resulting precooked product at the exit of the precooker had a moisture content in the range of 36–36.5 percent by weight, wet basis.

The precooked product was then ground in a comminuting machine and dried to a moisture content of about 6 to 10 percent by weight, wet basis, by subjecting it to air at 190 to 210° F. for about 20 minutes on a table-type drier. A portion of the dried material was reground in a hammer mill and it was thereafter found to have a cold-water absorbency of about 200 percent by weight and was characterized by excellent adhesive and cohesive properties.

Another portion of the dried precooked meal was ground and reground as necessary in a granulating type grinder so that all the material would pass through a No. 20 sieve and no more than about 3 to 5 percent would pass through a No. 70 sieve. It was found that this granulated product had properties which rendered it very suitable for sausage binding and other related uses. It also could be added to rapidly-boiling water, with stirring, without the formation of undesired lumps.

From the above detailed description and specific examples, it is apparent that the objects of this invention have been achieved. Specifically, a process is provided which actually precooks the product so as to enhance its edibility and/or palatability as is and/or after mere rehydration thereof. Not only does the process lend itself to high-capacity, large-volume production, it is also capable of precooking a product in finely-divided form in minimum time and without the use of high-cost machinery, high-power requirements or super atmospheric pressures. Further, the process does not result in a product having excessive moisture, which must then be removed by costly-drying techniques. Moreover, the process is highly flexible in that enzyme inactivation can be achieved, if desired, without substantial starch modification and the product can be otherwise controlled or tailored with respect to such characteristics as degree of "cook," flavor, water absorbency, adhesiveness, cohesiveness, and the like. Finally, a product is produced by this process which is substantially homogeneous, which may be added directly to boiling water without formation of undesired lumps and which differs in some undefined way as determined by organoleptic testing.

While the present invention has been described in connection with certain specific embodiments and examples thereof, it should be understood, of course, that the invention is not limited thereto. Alternative modifications of the present invention will be apparent from the above detailed description and specific examples to those skilled in the art, and such modifications are considered within the scope and spirit of the present invention.

Having thus described the invention, what is claimed is:

1. A process for precooking a substantially-water-insoluble farinaceous product which comprises mechanically agitating said product while in the form of finely-divided particles so as to highly disperse same; contacting said product while being so agitated with steam at elevated temperatures above about 150° F. and below about 300° F. for a period of about 5 to 45 seconds and in the presence of sufficient total moisture whereby the resulting precooked product prior to any substantial drying thereof has a moisture content in the range of about 15 to 50% by weight, wet basis; and thereafter drying said product to a moisture content substantially less than about 15% by weight, wet basis.

2. A process for precooking a substantially-water-insoluble farinaceous product which comprises prewetting said product to a moisture content in the range of about 15 to 50% by weight, wet basis; mechanically agitating said product while in the form of finely-divided particles so as to highly disperse same; contacting the prewetted product while being so agitated with steam at a temperature above about 150° F. and below about 300° F. for a period of about 5 to 45 seconds; and drying said product to a moisture content substantially less than about 15% by weight, wet basis.

3. A process for precooking a substantially-water-insoluble farinaceous product which comprises grinding said product to a particle size which passes at least a No. 6 sieve (U.S. Sieve Series); prewetting the resulting product to a moisture content in the range of about 15 to 50% by weight, wet basis; mechanically agitating the product so that the product is in highly-dispersed form and subjected to substantial physical stresses; contacting the highly-dispersed product with steam at about atmospheric pressure for a period of about 5 to 45 seconds; and grinding the contacted product so that substantially all passes a No. 10 sieve (U.S. Sieve Series) and is retained on a No. 70 sieve U.S. Sieve Series).

References Cited in the file of this patent

UNITED STATES PATENTS

| 1,002,990 | Herendeen | Sept. 12, 1911 |
| 1,727,429 | Fisher et al. | Sept. 10, 1929 |
| 2,880,093 | Kuhlmann et al. | Mar. 31, 1959 |
| 2,914,005 | Gorozpe | Nov. 24, 1959 |
| 3,054,676 | Lauhoff | Sept. 18, 1962 |

FOREIGN PATENTS

| 920 | Great Britain | of 1855 |
| 310,125 | Great Britain | Apr. 25, 1929 |
| 537,271 | Great Britain | June 16, 1941 |
| 722,737 | Great Britain | Jan. 26, 1955 |